(12) United States Patent
Pecot et al.

(10) Patent No.: US 6,540,208 B1
(45) Date of Patent: Apr. 1, 2003

(54) METHOD FOR INSTALLING AND/OR REMOVING A CABLE IN CABLE PASSAGE CONDUITS AND IMPLEMENTING DEVICE

(75) Inventors: Alain Pecot, Lannion (FR); Jean-Luc Campion, Saint Quay Perros (FR); Joel Le Cam, Lannion (FR)

(73) Assignee: France Telecom, Paris (FR)

(*) Notice: Subject to any disclaimer, the term of this patent is extended or adjusted under 35 U.S.C. 154(b) by 0 days.

(21) Appl. No.: 09/601,440

(22) PCT Filed: Feb. 1, 1999

(86) PCT No.: PCT/FR99/00201

§ 371 (c)(1),
(2), (4) Date: Jul. 31, 2000

(87) PCT Pub. No.: WO99/40660

PCT Pub. Date: Aug. 12, 1999

(30) Foreign Application Priority Data

Feb. 4, 1998 (FR) .............................. 98 01242

(51) Int. Cl.[7] .................................. H02G 1/08
(52) U.S. Cl. .............................. 254/134.4; 254/134.3 R
(58) Field of Search ....................... 254/134.4, 134.3 R, 254/134.3 FT

(56) References Cited

U.S. PATENT DOCUMENTS

| | | | |
|---|---|---|---|
| 4,185,809 A | * 1/1980 | Jonnes | 254/134.4 |
| 4,856,937 A | * 8/1989 | Grocott et al. | 254/134.4 |
| 5,240,228 A | * 8/1993 | Silveri | 254/134.4 |
| 5,699,996 A | * 12/1997 | Boyle et al. | 254/134.4 |
| 5,762,321 A | * 6/1998 | Petersen et al. | 254/134.4 |
| 5,884,384 A | * 3/1999 | Griffioen | 254/134.4 |
| 5,897,103 A | * 4/1999 | Griffioen et al. | 254/134.4 |

FOREIGN PATENT DOCUMENTS

| | | |
|---|---|---|
| EP | 0264767 | 4/1988 |
| EP | 0427354 | 5/1991 |
| EP | 0445858 | 9/1991 |
| EP | 0467463 | 1/1992 |
| WO | WO 9217927 | 10/1992 |
| WO | WO 9409538 | 4/1994 |

* cited by examiner

Primary Examiner—Lee Wilson
(74) Attorney, Agent, or Firm—Patterson, Thuente, Skaar & Christensen, LLC

(57) ABSTRACT

A method for installing and/or removing a cable (300) in conduits (500) for the passage of cables and to an associated implementing device. According to this method, a current of water is conveyed inside the conduits (500), the cable (300) to be installed has a conduit fill rate that can attain 90%, and the conduits (500) form a winding course on a length greater than 2000 m. This method is chiefly characterized in that the cable (300) is subjected to a thrust force that drives its speed of progression (v), and in that said thrust force and the pressure of the water flowing in the conduits are regulated so as to maintain a constant water flow rate inside the conduits (500).

12 Claims, 5 Drawing Sheets

METHOD FOR INSTALLING AND/OR REMOVING A CABLE IN CABLE PASSAGE CONDUITS AND IMPLEMENTING DEVICE

BACKGROUND OF THE INVENTION

1. Field of the Invention

The present invention pertains to a method for installing and/or removing cables in cable conduits. It relates more particularly not only to the installation and/or removal of optic fiber cables but also to the removal of copper cables which are in most conduits and may be retrieved for other uses. The invention furthermore relates to a device for the implementation of this method.

The standard methods of installing cables in cable conduits are often very costly and lengthy to implement, and can lead to rapid deterioration of the cable due to its friction against the internal walls of the conduit. A standard method shown in the diagram of FIG. 1 consists in placing a winch T at one end of the course and placing a reel B of cable 2 at the other end of the course. Then the line 1 of the winch T is made to pass into the conduits C, and then the end of the line 1 is hooked to an end of the cable 2 to be inserted. The cable 2 is then installed in the conduits C by pulling, in actuating the winch T in the direction of the arrow shown in FIG. 1. Furthermore, tracked systems 3 must necessarily be placed at regular intervals along the course in order to hold and guide the cable 2. These tracked systems 3 are therefore placed in underground chambers Ch1, Ch2, Ch3, Ch4 which are generally spaced out from one another at distances of 300 m. The continuous motion of these tracked systems 3 must furthermore be synchronized with the pulling speed dictated by the winch T. Consequently, this method calls for the presence of a workman at each active station, namely at each end of the path and in the underground chambers in which intermediate equipment is provided for the efficient running of the operations.

This method therefore calls for the use of heavy, bulky, and often costly equipment and the mobilizing of large numbers of workmen. Furthermore, to prevent the cable that is to be installed from deteriorating through friction against the walls of the conduits, the course taken has to be relatively rectilinear. The length of the course is also limited by the length of the winch line, the number of workmen to be deployed and the shape of the path to be made between the telephone central and the subscriber. This path necessarily includes curves and is subdivided into rectilinear sections. The maximum length of these sections is generally about 1500 m. In a 1500 m section of this kind, the method requires the presence of six workmen on the site.

Furthermore, this method requires the injection of lubricants to prevent excessively rapid deterioration of the cable through friction against the walls of the conduits. However, in this method, the deterioration of the cable is still inevitable because friction cannot be completely avoided.

Thus, the conventional way of installing a cable in a conduit takes a long time and is very costly, especially because there is a heavy deployment of workmen. Furthermore, the course defined by the conduits has to be subdivided into small relatively rectilinear sections. The cables must furthermore have a very low conduit fill rate, typically less than 20%, in order to prevent, as far as possible, friction against the walls of the conduits.

The fill rate is defined as the ratio between the diameter of the cable and the internal diameter of the conduit.

Other methods have been devised in recent years to improve the conventional methods, especially to reduce their cost and shorten the implementation time. These methods are based on the "floating" technique. In this method, a current of water is conveyed into the conduits in order to facilitate the transportation of the cable and reduce risks of friction of the cable against the wall. With a flow of water being created, the cable naturally tends to get centered in the flow of water.

2. Description of the Related Art

The patent application EP-A-0 264 767 describes a method for the introduction of a submerged optical cable into a conduit by means of friction of water on the cable. In this case, the cable has a conduit fill rate that is relatively low, since it is about 14%, and prevents friction against the walls of the conduit to the maximum extent. This method furthermore requires the use of floats that are placed regularly along the cable. These floats not only provide a better support for the cable but also improve the movement of the cable owing to the friction of water on them. However, nothing in this document says whether a regulation of the water flow rate is needed and there is even less of an indication of how to achieve a regulation of this kind. The progression of the cable is obtained solely through the friction of water on the cable and the floats. This method is therefore limited since it cannot be used to install cables with a very unfavorable conduit fill rate which may go up to 90% nor can it be used for installation on a highly winding course with a length of over 2000 m. Furthermore, this method cannot be used to remove cables occupying the conduits.

The patent application WO 94/09538 describes a method for the introduction of a cable into conduits within which there flows a current of water. According to this method, the cable is moved by mechanical assistance. In fact, this method is based on the technique of floating combined with pulling. Indeed, it consists in placing a plunger on the front end of the cable. The plunger is actuated by the pressure of water flowing in the conduit so as to pull the cable. A system designed simply to guide the cable so that it is accurately introduced into the conduit and centered in the flow of water is planned at the input of the conduit.

In this case, a variation of the pressure of water leads to a variation in the pulling force of the plunger and therefore a variation of the speed of movement of the cable. However, the pulling operation does not provide for efficient holding and efficient guiding of the cable over a great length. Furthermore, an excessive variation in the water pressure leads to a sudden variation in the speed of movement of the plunger and therefore affects the steadiness of the cable in the water current. There is a risk indeed that the cable may get swayed out of line to a greater or lesser extent and rub against the walls of the conduits, especially at the connections between the conduits or in the curvatures, thus causing a deterioration of its sheath.

The flow rate and water pressure are not constant all along the course. They are greater at the point where the water is injected and the cable is introduced, and they get smaller as and when the cable moves forward in the conduit and moves away from the injection point. It is therefore necessary to increase the water pressure as and when the plunger moves away, in order to keep a satisfactory speed of progression of the cable. However, this pressure should not be excessive in order to avoid pushing the cable against the walls of the conduit.

This method therefore cannot be used to install cables with a high fill rate of up to 90%. Furthermore, it is not suited to highly winding courses over lengths of at least 2000 m.

The patent application WO 92/17927 describes another method for the installation of cables in conduits by pressure from a fluid (water) flowing in these conduits.

The method described in this document comprises mechanical means (a reel) for paying out the cable at a speed that is as uniform as possible. When the first end of the cable is inserted into the first end of the conduit, a fluid (water) is simultaneously injected into the conduit in order to exert a flotation thrust and a drive force on the cable, enabling the cable to reach the other end of the conduit. The flow rate of the fluid therefore depends on the type of cable that has to travel through the conduit, and its value is computed as a function of the power needed to drive the cable.

This document does not describe any means to keep the flow rate of water constant in the conduit. It is on the contrary the speed of progression of the cable that is kept as constant as possible.

The method described in this document can be used to install a cable in lengthy, winding conduits but does not give a very high fill rate. Indeed, since the flow rate is not kept constant, the cable may be subjected to high pressure or sway out of line and rub against the walls of the conduit when there is a change in the flow rate. A fill rate of 90% would therefore be far too risky for the cable that is to be installed.

Furthermore, the methods that have just been described cannot be used to remove copper and/or optic cables occupying conduits without harming them. Now, it may be worthwhile to remove these cables and keep them intact for use in other applications.

OBJECTS AND SUMMARY OF THE INVENTION

The present invention overcomes the above-mentioned drawbacks. Indeed, it proposes a method for the introduction and/or removal of a cable in conduits defining a highly winding course with a length of over 2000 m, the cable having a very unfavorable fill rate configuration that can go up to 90%, wherein the cable is moved no longer by a pulling effect but by a thrust effect to which it is subjected.

The invention relates more particularly to a method for the introduction and/or removal of a cable in conduits for the passage of cables within which a current of water is conveyed, the cable having a conduit fill rate that can reach 90% and the conduits forming a winding course on a length of over 2000 m, characterized in that the cable is subjected to a thrust force that controls its speed of progression and in that the thrust force and the pressure of water flowing in the conduits are regulated so as to maintain a constant water flow rate within the conduits.

Since the water flow rate is constant and controlled in the conduits, the cable is borne in the same way along the conduits, thus considerably limiting the risks of impacts against the walls of the conduits.

OBJECTS AND SUMMARY OF THE INVENTION

The method according to the invention is fast and removes the need to use intermediate assistance. It requires the presence of only one workman to install a cable in conduits defining a winding course with a length of over 2000 m, capable of reaching 5 kilometers or even more depending on the rate of occupation of the conduits. Consequently, the method of the invention costs little. It can furthermore be used to install the cables according to the demand from subscribers. The method of the invention is therefore economically profitable.

Another object of the invention pertains to a device for the implementation of the method according to the invention. This device has the advantage of being compact and positioned on a single trailer towable by a light vehicle. It is therefore easy to move on a site. It is more particularly characterized in that it comprises:

thrust means to provide for the progression of the cable, a heat engine capable, through a selection switch system, of controlling either a hydraulic pressure circuit, said circuit being connected to a water tank and to an injection gun to inject water into the conduits, or an air compression circuit, said circuit being connected to said injection gun to inject compressed air into the conduits after the laying of a cable in order to drain them, sensors to measure the lengths and speed of progression of the cable and a strain gauge to measure the force exerted on the cable, said sensors and said gauge being linked to:

a central processing unit capable of managing the commands that are sent to it to drive the thrust means and the heat engine, and in that said device is positioned on a trailer towable by a light vehicle.

BRIEF DESCRIPTION OF THE DRAWINGS

Other advantages and particular features of the invention will appear more clearly from the following description given as a non-restrictive example with reference to the appended figures, of which.

DESCRIPTION OF THE PREFERRED EMBODIMENTS

Figure 1:
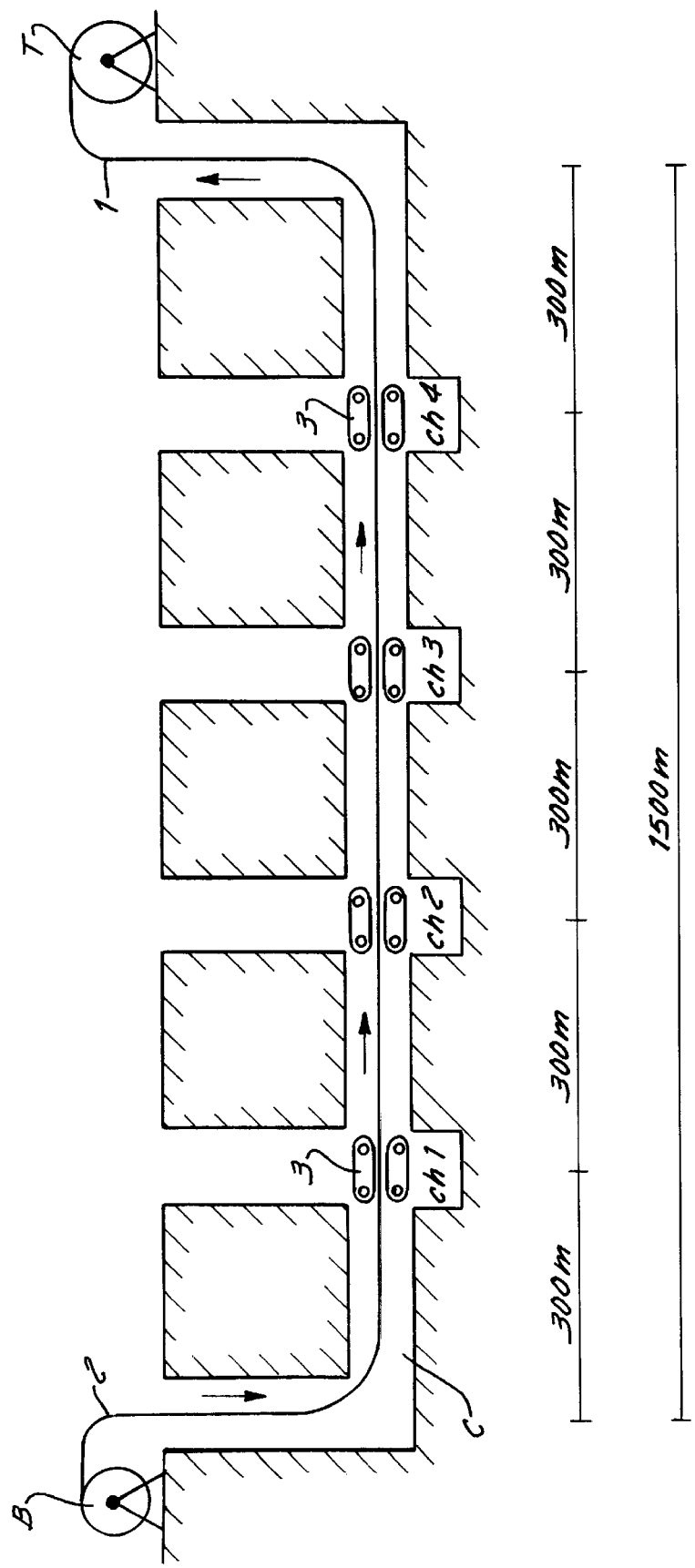
FIG. 1, already described, is a drawing of a standard cable laying method.
Figure 2:
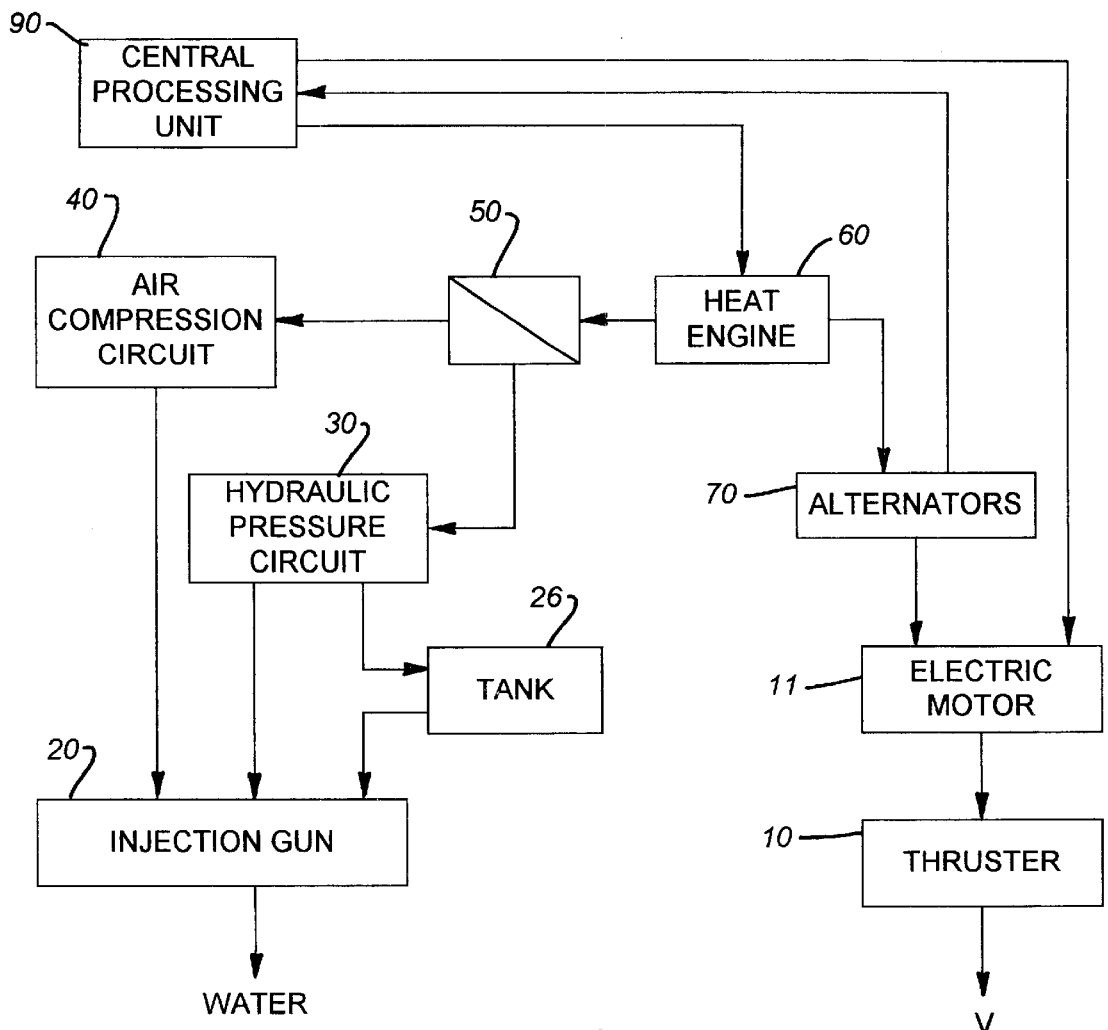
FIG. 2 is a drawing of different constituent elements of a device according to the invention and of the links between these elements.

FIG. 2 gives a schematic view of the different constituent elements of the device according to the invention and the links between these different elements. Thruster means 10 exert a thrust force on the cable to be installed in order to transmit a speed of progression v to it. A heat engine 60, through a selection switch system 50, controls either a hydraulic pressure circuit 30 or an air compression circuit 40. The selection switch system 50 may for example be a lever that can be actuated by hand.

The heat engine 60, through a set of pulleys and belts, continuously drives two alternators 70. The first alternator gives the excitation current of the second alternator. These two alternators do away with the need to use a big battery and produce the current needed to power firstly an electric motor 11 controlling the thrust means 10 and secondly a central processing unit 90.

The central processing unit 90 displays several pieces of information simultaneously. This information is given by measurement sensors and relates especially to the flow rate of water in the conduit in terms of liters per minute, the length of a cable engaged in the conduit in meters, the speed of progression of the cable in meters per minute and the water pressure in bars. This central processing unit 90 is furthermore used to control other information, especially the current and the voltage applied to the electric motor that controls the thruster means 10, in order to assess the thrust force exerted on the cable.

The central processing unit 90 furthermore manages the commands that are transmitted to it by a workman, to drive the thrust means 10 through the electric motor 11 and the heat engine 60. It furthermore stores said commands and the measurements made by the sensors in an appropriate memory.

It is also possible to set an instructed speed value not to be exceeded, namely a maximum thrust force beyond which the thrust means stop instantaneously. This prevents any deterioration of the cable that might be caused for example by the untimely sliding of the sheath of the cable or again by an intensive thrust force that causes it to break.

The hydraulic circuit 30 is connected firstly to an injection gun 20 and secondly to a water tank 26. This water tank 26 contains one or more tons of water. In an alternative embodiment, the water supply may also be provided a connection to a fire hydrant or else a simple tap if a buffer container is used.

When the heat engine 60 activates the hydraulic pressure circuit 30, the water from the tank 26 is injected into the conduits with a certain flow rate and at a certain pressure through the injection gun 20. The water pressure is adjustable from the central processing unit 90 through the heat engine 60. The details of the pressure circuit are explained hereinafter.

When the heat engine 60 activates the air compression circuit 40, compressed air is injected into the conduits through the injection gun 20 in order to drain the conduits in which a cable has been installed. A pressure gauge indicates the output pressure and a safety valve limits the service pressure to 12 bars.

The entire arrangement is put together on a trailer towable by a light vehicle.

Figure 3:
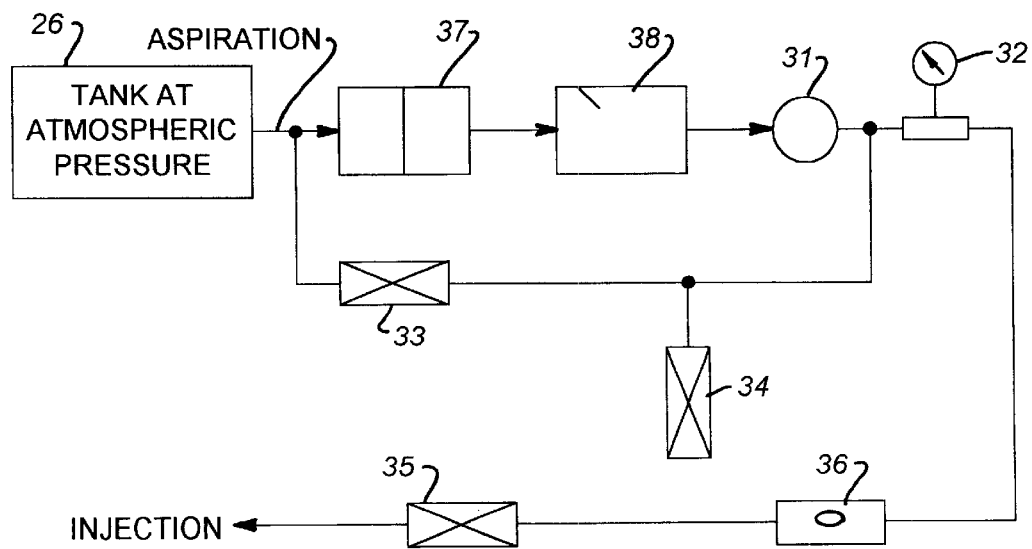
FIG. 3 is a drawing of a hydraulic pressure circuit used in the device according to the invention.

FIG. 3 gives a schematic view of the pressure circuit 30. This circuit is used to deliver pressure of up to 25 bars with a suction circuit connected to a water tank 26 at atmospheric pressure.

A hydraulic pump 31, constituted for example by a multistage pump with a stainless steel body, is used to pressurize the circuit. A pressure gauge 30 controls the pressure during the injection of water into the conduits.

A setting valve 33 carries out the fine adjustment of the pressure and its stabilization as a function of the flow rate used. It is in this valve that the central processing unit acts through the thermal engine.

A discharge valve 34 furthermore brings about the return to the tank 26 at atmospheric pressure when the output valve 35 for the injection of water into the conduits is closed. This removes the need to keep the circuit under load when the water consumption is zero. Furthermore, this discharge valve 34 is preferably located at a high point to facilitate airing during the operation for draining the conduits after a cable is laid.

Furthermore, a flow meter 36 delivers pulses that are converted in the central processing unit into a display in liters/minute. A screen filter 37 limits the risk of pollution of the circuit by elements with a size of more than 0.5 mm which is well tolerated by the pump. System 38 with security against lack of water furthermore prevents the pump from working when empty.

Figure 4:
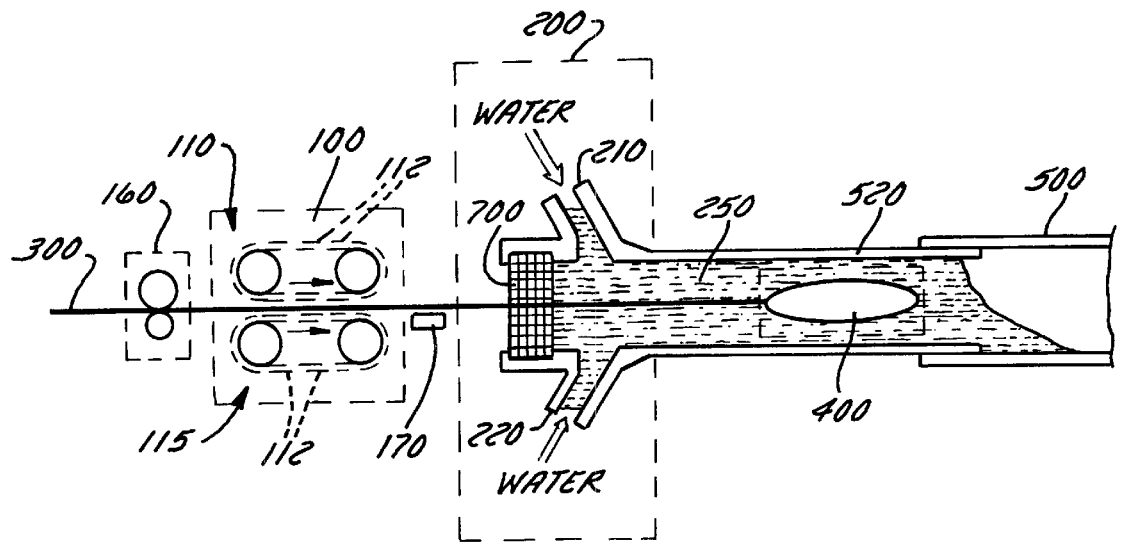
FIG. 4 is a schematic diagram of the method and device according to the invention.

FIG. 4 gives a schematic view of the method and device of implementation according to the invention. The method consists in introducing a cable 300 into a conduit 500 and in injecting water 250 under variable pressure by means of an injection gun 200. As a flow of water is created in the conduit 500, the cable tends to get centered in the current. The insertion of the cable 300 into the conduit 500 through an intermediate tube 520 is done by thrust means 100 which exert a thrust force on the cable.

A length and speed sensor 160 is placed at the rear of the thrust means 100. It consists of two mobile rollers maintained under pressure by a spring. The cable runs between the two rollers. One of the rollers has a groove to position the cable. The other is knurled so as to limit the risk of measurement error related to the possible slipping of the cable. This sensor is of course directly linked with the central processing unit.

Furthermore, a strain gauge 170, directly linked with the central processing unit and designed to measure the thrust force exerted on the cable is placed in front of the thrust means 100.

It is also advantageous to place a calibrated tip 400 at the end of the cable 300. This calibrated tip 400 preferably takes the form of a nose cone and stabilizes the cable in the current and guides it so that it easily passes through the connections between the conduits and the curvatures. Furthermore, it is important to maintain a head of water in the conduits on the entire length of the cable, throughout the time of its installation, whatever the profile of the course. For this purpose, it is necessary to limit the relieving of the pressure on the fluid at the end of the cable. This function is carried out by the tip. This tip is described in greater detail hereinafter.

A premature filling of the conduit would entail disadvantages for several reasons. First of all, the tip 400 would push a water head. This would prematurely increase the thrust forces needed to lay a cable. Furthermore, this would imply a laying operation with the maximum pressure at the injection point in order to compensate for the load loss on the entire course, a major consumption of water, heavy demand on the equipment and increased laying time.

With respect to the thrust means, two versions have been prepared for the device according to the invention. A first version answers the problem of laying small cables requiring thrust forces of less than 30 DaN (Deca Newtons) and adapting to their small diameter. This is the "roller-fitted thruster". A second version which is far more powerful responds to the implementation of high-capacity bulky cables, whose diameter may go up to 30 nm, tolerating thrust forces of up to 100 DaN. This is the "tracked thruster" or "skid thruster".

The two types of thrusters are compact with reasonable weight of about a dozen kg., and have a handle to facilitate their transport.

The second skid thruster version is shown schematically in FIG. 4. An electric motor, not shown in this figure, drives two systems 110, 115 in continuous movement provided with driving skids 112. These two systems are placed one above the other so that the cable 300 is clamped between their driving skids 112 and pushed by said skids in a motion of progression in the direction of the arrow shown in FIG. 4.

Figure 5:
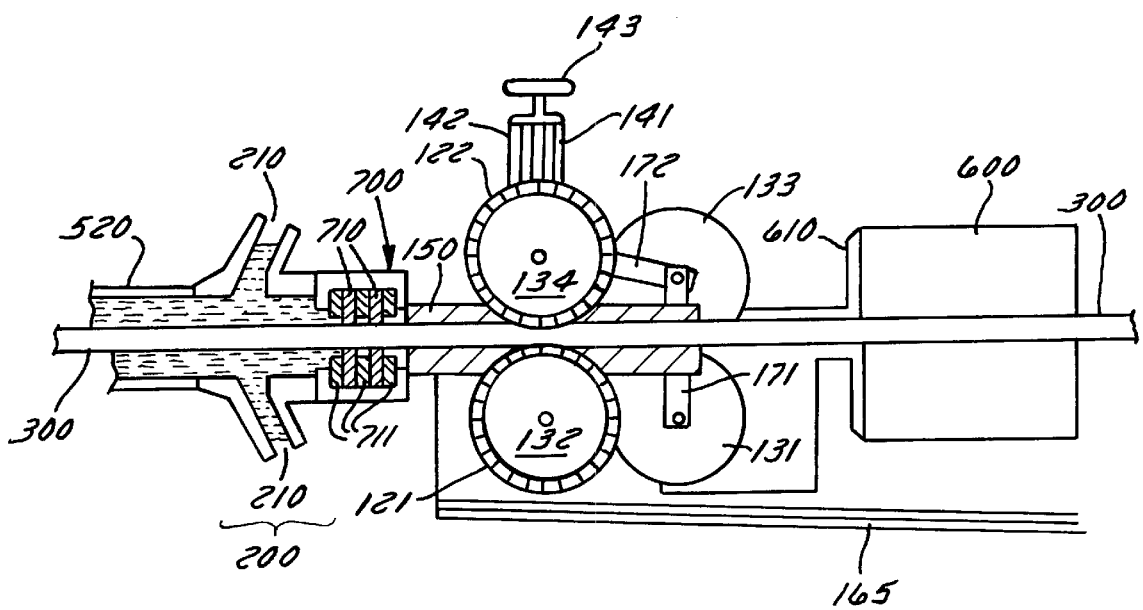
FIG. 5 is a schematic drawing of a roller-fitted thruster device.

The roller-fitted thruster is illustrated in the diagram of FIG. 5. A continuous ventilation electric motor 600, coupled as the case may be to a power reduction gear 610, drives two rollers 121 and 122 through a set of four pinion gears 131, 132, 133, 134.

The lower roller 11 is fixed to the support 165. Its rotation is provided directly by the two pinion gears 131 and 132 located on either side.

The upper roller 122 is mobile so as to enable a setting to be made according to the diameter of the cable to be laid. It is mounted on two guiding columns 141, 142 which position its axis in line with the axis of the lower roller 121. The upper roller 122 is driven by the two mobile pinion gears 133 and 134 located on either side of this roller 122. The pinion gear 134 is guided in the same way as the upper roller 122 by the two columns 141, 142.

During the movement of the intermediate pinion gear 133, its axis describes an arc of a circle so that it remains always in contact with the neighboring pinion gears 131 and 134 which respectively drive the lower roller 121 and the upper roller 122. For this purpose, two flanges 171, 172 maintain the distance between centers of the pinions 131, 133 and 133, 134. The axis of the pinion 133 therefore serves both as a support and as a hinge.

The rollers have an incurvated edge so as to match the shape of the cable 300 and thus increase the contact surface with it. Furthermore, their edge is covered with a flexible and highly adhesive coating such as silicone for example. The unit efficiently transmits the thrust forces to the cable.

Besides, the flexibility of the lining makes it possible, by putting the rollers under pressure, to cover a wide range in the diameters of cables to be laid.

A mobile plate 150 acts as a support for the guiding of the cable in the front and rear of the rollers and also as a gasket and anchor 700 for the injection gun 200. Since the diameter of the cable 300 can be variable and since the lower roller 121 is fixed, it is indispensable to correct the position of the plate 150 to ensure that the cable is properly aligned in the drive rollers 121, 122. A spring system gives an automatic centering of the plate 150 on the cable when contact is set up with the upper roller. The shifting of the plate 150 is obtained by sliding on the two guiding columns 141, 142 which support the upper roller 122.

The set of the elements of the roller-fitted thruster is positioned on a tilting support 165. The skid thruster is also mounted on a tilting support which is not shown in FIG. 4. Since the weight of the support varies with its tilting angle and the thrust force to be given to the cable also depends on the titling angle of the support, the strain gauge 170 and the length and speed sensor 160 are calibrated according to the tilt. Similarly, the instructed value is modified according to the angle of tilt of the support. Furthermore, the tilting support may be fixed directly in an underground chamber, on props, in order to position the cable in the alignment of the conduit.

The thrust force to be given depends on the resistance of the cable to the thrust. The greater this resistance the greater the thrust force exerted on the cable may be high. However, if the resistance is low, the thrust force to be applied should be lower to prevent any breaking of the cable.

The central processing unit regulates both the water pressure and the thrust force transmitted to the cable so that the water flow rate in the conduits is kept constant throughout the course followed by the cable to be installed.

For this purpose, the central processing unit acts on the flow rate of the motor controlling the hydraulic circuit. The greater the load losses in the conduits throughout the course, the more necessary is it to increase the flow rate of the motor in order to increase the water pressure. However, increasing the water pressure is not enough to keep the flow rate constant in the conduit. Indeed, the calibrated tip 400 placed at the cable head, used to guide the cable in the conduits, also has the function of limiting the leakages and reduces the water flow rate along the course. To increase the flow rate, it is therefore necessary to exert a greater thrust force on the cable to make it advance more rapidly and to reduce the flow-rate limiting effects.

Consequently, to maintain a constant flow rate throughout the course in the conduits, it is necessary to regulate not only the pressure of water but also the thrust force transmitted to the cable which controls the speed of progression of the cable.

An instructed value of maximum force is furthermore memorized in the central processing unit. The strain gauge 170 constantly measures the thrust force exerted on the cable and sends the results of the measurement to the central processing unit. The results of the measurement are then compared with the instructed values. If the instructed threshold is exceeded, the hydraulic circuit gets cut off and the thrust means will stop instantaneously. This prevents a break of the cable when the thrust force becomes excessive. When the thrust means start again, a starting speed instruction (or thrust force) recorded in a memory of the central processing unit is followed so as to prevent any excessively sudden thrust force on the cable which might cause it to break.

Preferably, the water pressure flowing in the conduits is regulated so that it does not exceed 30 bars and the speed of progression (v) of the cable, controlled by the thrust force, is regulated in such a way that it does not exceed 40 m/min so as to maintain a constant flow rate of water below or equal to 80 l/min throughout the course defined by the conduits 500.

The tight-sealing of the water injection gun is important. A seal referenced 700 is shown schematically in FIGS. 4 and 5. This seal consists of a succession of flexible washers 710 (see FIG. 5), for example made of polyurethane alternating with rigid spacers 711, for example made of polytetrafluoroethylene better known as commercial Teflon.

The flexible washers made of polyurethane foam 710 are adjusted to the diameter of the cable with a tolerance of some tens of mm. They are furthermore notched slantways so as to limit water leakages. The pressurizing of the tight-sealing module 700 compresses the flexible washers 710 through the Teflon spacers 711. The Teflon spacers 711 limit the deformation of the flexible washers 710 while carrying out the guiding function in the tight-sealing module 700. They furthermore limit friction in the event of contact and tolerate a drilling operation in order to be installed on the cable.

The washers are placed alternately in the module 700 and the notches are offset by at least 90° with respect to each other. The assembling of the washers 710 and the spacers 711 begins and ends with a rigid spacer 711.

The body of the injection gun 200 has two entities, 210, 220 arranged in an angle smaller than or equal to 45° with respect to the axis of the conduit 500 in the sense of the laying of the cable, thus limiting the risks that the cable will be pushed against the injection gun and in the entry to the conduit under the effect of pressure which may reach 25 bars.

Figure 6:
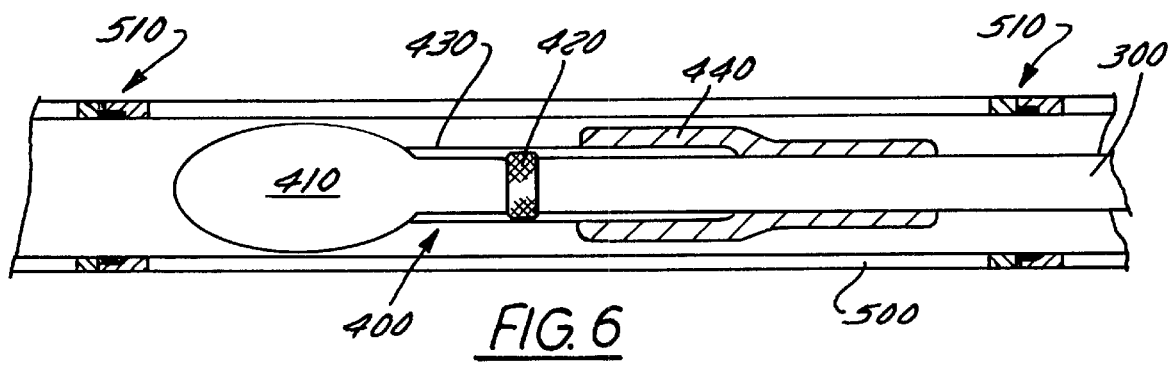
FIG. 6 is a drawing of a tip designed to be fixed to the end of the cable to be installed.

FIG. 6 gives a schematic view of the calibrated tip 400 placed at the head of the cable 300 and designed to guide the cable in the conduits 500. This tip in fact provides for tight-sealing and guides the end of the cable 300 and also calibrates the leakage flow rate. The material used to manufacture it may be polytetrafluoroethylene, polyvinyl chloride or even metal. This tip furthermore can be completely dismantled and reused.

The head 410 of the tip gets screwed into a junction bush 430 that itself gets screwed on to the duct of the cable 300. The screwing in of the unit formed by the bush 430, the cable 300 and the head 410 of the tip ensures the pressurizing of a flexible seal 420 placed at the end of the cable 300 and providing for the tight-sealing of the head of the tip. This flexible seal is made for example of rubber or polyurethane mastic.

In one alternative embodiment, it is also possible to provide for an additional guarantee for the tight-sealing by positioning a heat-shrinking sleeve 440 at the junction between the bush 430 and the sheath of the cable 300. This sleeve furthermore holds the bush 430 to the cable.

Through its nose-cone shape, the tip head 410 prevents any clinging in the conduit especially at the connection points 510 of the conduits or in the curvatures.

Figure 7A:
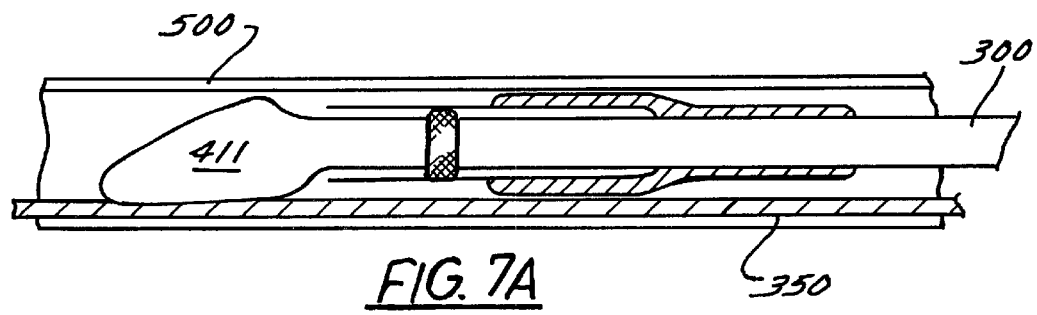
FIGS. 7A to 7C are drawings of different tips used for the laying of a cable in conduits occupied by one or more cables.
Figure 7B:
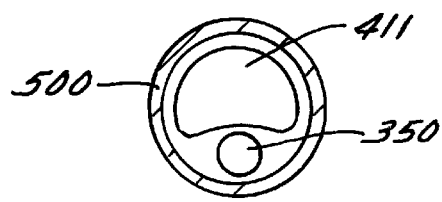
Figure 7C:
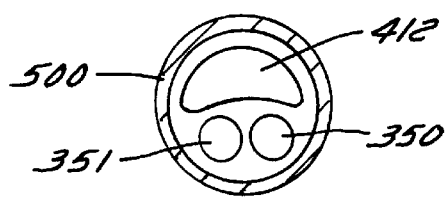

Other embodiments are planned in the event of a multiple laying of cables in a conduit since the rate of occupation of the conduit 500 dictates the use of particular tips. Indeed, in the case of multiple laying, the shape of the tip 410 evolves as a function of the occupation of the conduit so as to fulfill the guiding functions and limit the flow rate referred to here above and prevent the deterioration of the sheaths of the cables which already occupy the conduit. This actually means truncating the initial nose cone while keeping all the rounded edges. On this principle, it is therefore possible to define a range of tips for laying configurations ranging from 1 to n cables; Thus, FIG. 7A gives a schematic view of the head 411 of a calibrated tip used during the laying of a cable 300 in a conduit 500 occupied by a first cable 350. FIG. 7B shows a sectional view, in the section of the conduit 500, of the head 411 of the tip of FIG. 7A above the cable 350 occupying the conduit. FIG. 7C gives a sectional view of another head 412 of a tip used during the installation of a cable in a conduit already occupied by two cables 350, 351.

Furthermore, in certain cases it may be advantageous to modify the surface condition of the cable so as to make it more uneven in the flow and therefore generate greater driving forces on this flow. For this purpose, a tool called an "appearance modifier" is used. This tool may take the form of an assembly of several striated wheels each prompting the modification of the surface condition of the cable in a given sector. This modification of the surface condition is made for example just before it is installed in the conduits.

The conduits used are preferably low-cost conduits. Thus conduits made of polyvinyl chloride, polypropylene or high density polyethylene, have good performance characteristics. It is also possible to envisage the use of other recticulate type conduits which are more costly but have better performance in terms of load losses.

The following table summarizes examples of different parameters used for the laying of cables of different diameters, according to the method of the invention.

| Conduit diameter | Cable diameter | Fill rate | Water pressure | Speed | Water flow-rate |
|---|---|---|---|---|---|
| 11 mm | 6 mm | 55% | ≦5 bar | 30 m/min | 80 l/min |
| 50 mm | 29 mm | 58% | ≦4–6 bar | 30 m/min | 80 l/min |
| 33 mm | 29 mm | 88% | ≦22 bar | 30 m/min | 20 l/min |
| 26 mm | 22 mm | 85% | ≦20 bar | 30 m/min | 30 l/min |

The higher the fill rate, the greater the load losses in the conduits and therefore the greater the need to increase the water pressure and maintain the flow rate at a relatively low value. If it is desired to have a higher flow rate at high pressure, the speed of progress of the cable has to be increased, i.e. a greater thrust force has to be exerted on the cable. In this case, it is necessary to exercise greater vigilance because the thrust force should not be too intense if a breakage of the cable is to be avoided.

Figure 8:
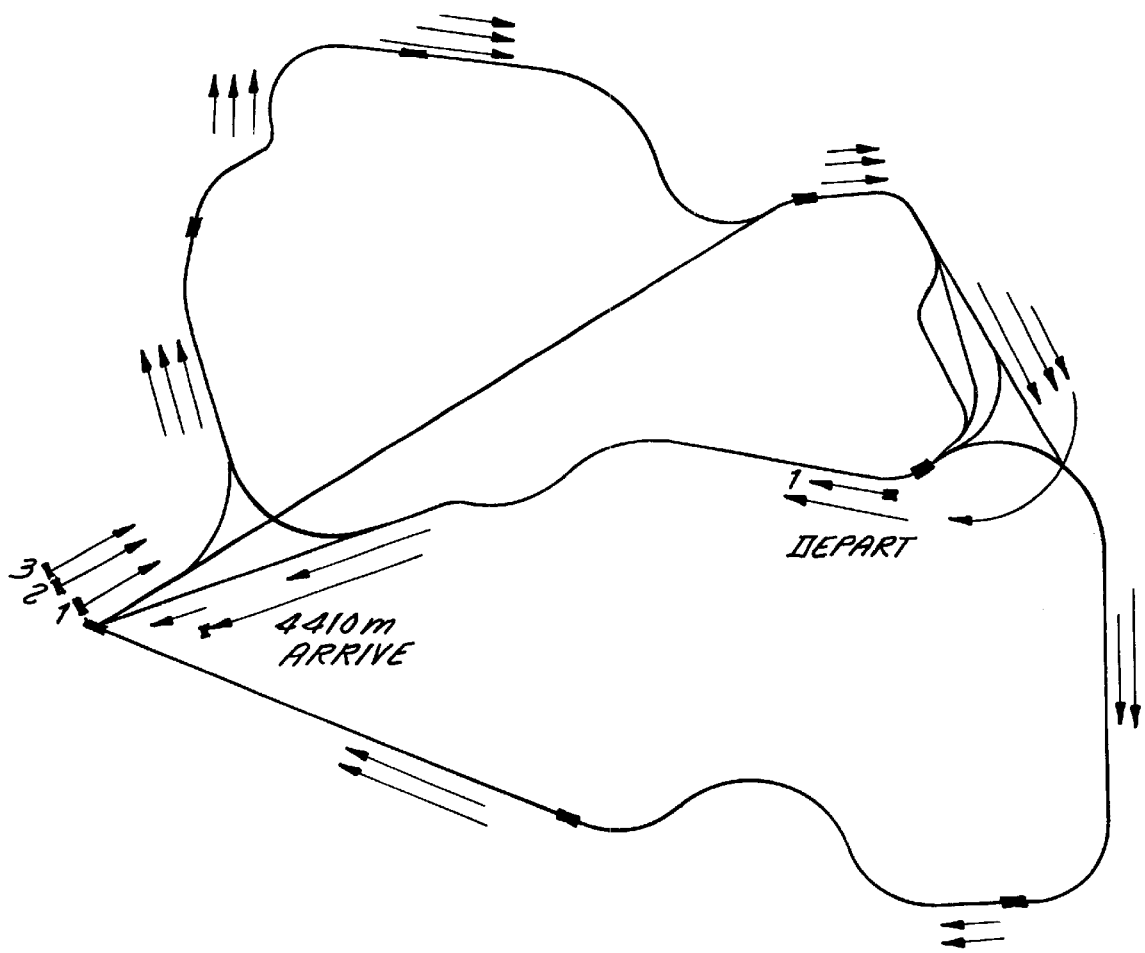
FIG. 8 is a drawing of a winding course along which cables can be installed through the method of the invention and its installation device.

FIG. 8 gives a schematic view of a winding course with a length of 4410 m, along which it is now possible to install cables through the method according to the invention. The laying of a 13 mm diameter cable in 32 mm diameter conduits (fill rate=40%) on a course of this kind has been achieved with a water pressure of 20 bars, a water flow rate of 20 l/min and a speed of progression of 30 m/min. This laying was done in one stroke without intermediate assistance and took 2 hours 27 minutes.

Furthermore, the method according to the invention is economical because it can be used to lay small cables between the telephone central and one or more subscribers. Indeed, it can be used to lay cables as required by subscribers. Thus, in the conduit, instead of initially laying a single 6 mm diameter cable with 24 optical fibers, it is possible to lay one or more cables with a 4 mm diameter having 12 optic fibers each or again one to four cables with a 2 mm diameter having 6 optic fibers each, depending on demand from subscribers.

The device according to the invention furthermore enables the removal of optic fiber cables as well as standard copper cables. The removal of the optic fiber cables is done under the same conditions as that of their installation. By contrast, for copper cables, the removal conditions are somewhat different.

It appears to be worthwhile to recover the copper cables for other applications. However, for them to be reused, these cables must be kept intact. Now, it often appears necessary to cut them out into small sections when removing them from the conduits. The device according to the invention enables them to be recovered in a single stroke. For this purpose, in a first stage, it is necessary to count the splicings in the underground chamber. Each copper cable has a length of about 300 m which corresponds to the distance between two underground chambers. Then, water is injected at a first end of a conduit and the copper cable is recovered at the other end of the conduit. In this case, the flow rate of injected water must be very high. It is for example 200 l/min so that the water can push the cable by simple friction with it, with a force that is sufficient to remove it.

The injection of water into the conduit to remove the cable reduces the force applied to the conduit by half. Thus, to remove a copper cable with a diameter of 45 mm from a conduit with an internal diameter of 77 mm, when there is no injection of water, the force used ranges from 160 to 220 DaN whereas it is only 80 DaN when water, which plays the role of a lubricant, is injected into the conduit. The duration of the removal of such a cable is very short since it takes only about 10 minutes. The removal however requires the use of two workmen, one at each active station located at each end of the conduit.

In the case of the removal of cables, the water injection gun is different from the one used for the laying and/or the removal of optic fiber cables and it is fixed to the conduit. For this purpose, it has a tube whose diameter is of the same order of magnitude as that of the conduit, terminated by a ring with a width of about 10 cm whose diameter matches that of the conduit. This ring comprises a flexible material, for example silicone, to provide for the tight sealing of the system. It is furthermore fixed to the conduit by clamping by means of a packing box system. The same type of gun may be fixed to other end of the conduit to facilitate the recovery of the copper cable which is thrust into the tube of the gun under the effect of friction of the water flowing at a high flow rate in the conduit.

What is claimed is:

1. A method for at least one of introduction and removal of a cable (300) in conduits (500) for passage of cables within which a current of water is conveyed, comprising:

subjecting the cable (300) to a thrust force along with a pressure of water that controls its speed of progression; and regulating said thrust force and the pressure of water flowing in the conduits so as to maintain a constant water flow rate within the conduits (500) in order to enable the installation of cable having a cable fill rate that can reach 90 percent of the conduits and the conduits forming a winding course on a length of over 2000 m; wherein the cable (300) is a fiber-optic cable, and in that the pressure of the water flowing in the conduits (500) is regulated in such a way that it does not exceed 30 bars and the speed of progression of the cable, driven by the thrust force, is regulated in such a way that it does not exceed 40 m/min, in order to keep the water flow rate constant, and less than or equal to 80 l/min, throughout a course defined by the conduits (500).

2. A method for the removal of cables occupying conduits (500) within which a current of water is conveyed, comprising:

removing cables made of copper; and conveying water at a pressure in the conduits of lower than 20 bars and a water flow rate ranging from 100 to 200 l/min along with a thrust force.

3. A method for at least one of an introduction and removal of a cable in conduits for passage of cables within which a current of water is conveyed, comprising:

subjecting the cable to a thrust force along with a pressure of water that controls its speed of progression;

detecting cable characteristics indicative of cable status; and regulating said thrust force and the pressure of water flowing in the conduits based on the detected cable characteristics so as to maintain a constant water flow rate within the conduits in order to enable installation of cable having a cable fill rate that can reach 90 percent of the conduits and the conduits forming a winding course on a length of over 2000 m.

4. A method for at least one of an introduction and removal of a cable in conduits for passage of cables within which a current of water is conveyed, comprising:

subjecting the cable to a thrust force along with a pressure of water that controls its speed of progression;

detecting cable characteristics indicative of cable status; and regulating said thrust force and the pressure of water flowing in the conduits so as to maintain a constant water flow rate within the conduits in order to enable installation of cable; having a cable fill rate that can reach 90 percent of the conduits and the conduits forming a winding course on a length of over 2000 m; wherein the cable to be at least one of introduced and removed is a fiber-optic cable, and in that the pressure of the water flowing in the conduits is regulated in such a way that the pressure does not exceed 30 bars and the speed of progression of the cable, driven by the thrust force, is regulated in such a way that the speed does not exceed 40 m/min, in order to keep the water flow rate constant, and less than or equal to 80 l/min, throughout a course defined by the conduits.

5. The method according to claim 3, further comprising laying of a cable in conduits occupied by at least one other cable.

6. The method according to claim 3, further comprising modifying the condition of the surface of the cable, prior to an introduction of the cable into the conduit, in order to increase forces of friction of the water on the cable.

7. The method according to claim 3, wherein the step of detecting cable characteristics indicative of cable status comprises measuring the length of the cable.

8. The method according to claim 3, wherein the step of detecting cable characteristics indicative of cable status comprises sensing the speed of progression of the cable.

9. The method according to claim 3, wherein the step of detecting cable characteristics indicative of cable status comprises sensing the force exerted on the cable using a strain gauge.

10. A method for at least one of introduction and removal of a cable (300) in a conduit (500) within which a current of water is conveyed, the cable having an outer diameter and the conduit having an internal diameter, the method comprising:

passing the cable (300) through an internal passage in a seal to a water gun area and then into the conduit;

subjecting the cable (300) to a thrust force before the cable passes through the internal seal passage to control a speed of the cable through the conduit, subjecting the cable to a pressure of water within the conduit to control the progression of the cable through the conduit; and regulating the thrust force and the pressure of water within the conduit so as to maintain a constant water flow rate within the conduit in order to enable the installation of the cable with a ratio of the cable diameter to the conduit internal diameter that can reach 90 percent and the conduit forming a winding course greater than 2000 m in length.

11. The method according to claim 10, wherein the conduit is occupied by at least one other cable.

12. The method according to claim 10, further comprising the step of modifying the condition of the surface of the cable (300) using a tool including striated wheels prior to the step of passing the cable into the conduit, in order to increase forces of friction of the water on the cable.

* * * * *